United States Patent [19]

Heins et al.

[11] Patent Number: 4,910,005

[45] Date of Patent: Mar. 20, 1990

[54] PROCESS FOR THE REDUCTION OF NITROGEN OXIDES FROM EXHAUST GASES

[75] Inventors: Hans-Hermann Heins, Leverksen; Siegfried Gruhl, Engelskirchen-Ruenderoth; Klaus Holzer, Leverkusen; Michael Bueb, Dormagen, all of Fed. Rep. of Germany

[73] Assignee: Bayer Aktiengesellschaft, Leverkusen, Fed. Rep. of Germany

[21] Appl. No.: 311,485

[22] Filed: Feb. 16, 1989

Related U.S. Application Data

[63] Continuation-in-part of Ser. No. 226,246, Jul. 29, 1988.

[30] Foreign Application Priority Data

Aug. 19, 1987 [DE] Fed. Rep. of Germany ....... 3727643

[51] Int. Cl.$^4$ .......................... B01J 8/00; C01B 17/00
[52] U.S. Cl. .................................................. 423/239
[58] Field of Search ................... 423/239 A, 239, 235, 423/235 D

[56] References Cited

U.S. PATENT DOCUMENTS 3,887,683 6/1975 Abe et al. ............................ 423/239
4,629,609 12/1986 Fruhbuss ............................. 423/239

Primary Examiner—Gregory A. Heller
Attorney, Agent, or Firm—Sprung Horn Kramer & Woods

[57] ABSTRACT

A process for the reduction of nitrogen oxides contained in exhaust gases comprising reacting the gases with a reducing agent in the presence of a catalyst, the catalyst being based on carbon and having a carbon content greater than 65% by weight and containing 0.1 to 10% by weight of a sparingly soluble oxide of one or more metal selected from the group consisting of Co, Fe, Ni, Cr, V, Mo, W, Cu, Mn and Ti and having a nitrogen content of from 0.5 to 5% by weight, wherein the molar ratio of the reducing agent to the nitrogen oxide is 0.3 to 0.7.

8 Claims, No Drawings

PROCESS FOR THE REDUCTION OF NITROGEN OXIDES FROM EXHAUST GASES

CROSS REFERENCE TO RELATED APPLICATION

This application is a continuation-in-part application of application Ser. No. 07/226,246, filed July 29, 1988, now pending.

BACKGROUND OF THE INVENTION

1. Field of the Invention

The present invention relates to a process for the reduction of nitrogen oxides from exhaust gases by their reaction with reducing agents on catalysts.

2. Background Information

The selective removal of nitrogen oxides from exhaust gases is generally carried out by a reaction with ammonia. In the absence of catalysts, this reaction proceeds at temperatures in the region of 900° C. in the gaseous phase. This temperature may be reduced by means of special catalysts. It is desirable to lower the temperature as much as possible in order to avoid the expensive heating up of flue gases, in particular after a desulphurization of the flue gas. A technical catalyst is required not only to be capable of high catalyst loading with as far as possible complete conversion, but also to have a long catalyst life with low pressure losses.

In the widely used SCR process (selective catalytic reduction) using catalysts based on $TiO_2$, it is necessary to employ temperatures above 350° C., which partly necessitates the uneconomical reheating of the gases. Moreover, catalysts suitable for such processes (DE-C 2 458 888 = U.S. 4,085,193) are expensive to produce.

The catalytic degradation of $NO_x$ with ammonia from active charcoal proceeding at temperatures of from 120° to 150° C. has been disclosed in DE-A 2 911 712. One disadvantage of this process is that it requires very large quantities of coal. The amount of active coke required for a power plant conducting 300 MW is about 50 tons per year with an initial filling of about 500 t.

SUMMARY OF THE INVENTION

It is an object of the present invention to provide a process which is free from the above described disadvantages of the known processes.

A process which is eminently suitable for fulfilling these requirements has now surprisingly been found. This process is the subject of the present invention.

This invention relates to a process for the reduction of nitrogen oxides from exhaust gases by their reaction with reducing agents on catalysts, characterised in that catalysts based on carbon and having a carbon content above 65% by weight and containing a total of from 0.1 to 10% by weight of sparingly soluble oxides of the metals Co, Fe, Ni, Cr, V, Mo. W, Cu, Mn and Ti and from 0.5 to.5% by weight nitrogen are used, wherein the molar ratio of the reducing agent to the nitrogen oxide is 0.3 to 0.7. Such catalysts have not hitherto been known. These catalysts and processes for their preparation are the subject of German Patent Application P 37 27 642, filed 8-19-87. Particularly active catalysts are those which contain Cu and/or V. It is particularly advantageous to use carbon monoxide as a reducing agent in the process according to the invention, but the process may also advantageously be carried out with ammonia, which is used in most processes for the reduction of the nitrogen oxide content.

One great advantage of the process according to the invention is that the catalyst has such a high catalytic activity that it is required only in comparatively small quantities, which has an advantageous effect on the pressure loss. The catalyst is advantageously installed in solid bed layers in the stream of gas to be purified. No loss of activity was found in the catalyst during several test runs.

DETAILED DESCRIPTION OF THE INVENTION

The process according to the invention is carried out at a volumetric velocity of from 500 to 10,000 $h^{-1}$, preferably from 1000 to 3000 $h^{-1}$. Another advantage of the process according to the invention is that the reduction takes place at temperatures from 50° to 180° C., preferably from 90° to 150° C. so that it is in most cases not necessary to heat up the exhaust gases which are to be purified and less high quality materials may be used for the apparatus.

The reducing agents added to the process according to the invention are normally distributed as uniformly as possible. According to the invention, the molar ratio of reducing agent to nitrogen oxide is in the range of from 0.3 to 0.7. Under optimum conditions, conversion rates of more than 90% may be achieved. As the process according to the invention is very simple to handle, it is suitable for use both in power plants and for purifying smaller quantities of exhaust gas formed in other processes.

The invention is described below with the aid of an example, which should not be regarded as limiting the invention.

EXAMPLE

From 1 to 5 $m^3/h$ of flue gas from a gas firing containing from 200 to 300 ppm (375 to 565 $mg/m^3$ of $No_x$) of nitrogen oxides are reacted with $NH_3$ concentrations of from 150 to 300 ppm (from 100 to 200 $mg/m^3$) in a pilot plant. The flue gas is carried at the rate of 720 $h^{-1}$ through a column 80 mm in diameter and 1800 mm in filling height which is filled with catalyst. The column is heated with a thermostatic oil. The temperatures in the column are in the range of from 120° to 130° C. With a slippage of from 8 to 40 ppm of $NH_3$ (<30 $mg/m^3$), $NO_x$ values of 12 to 47 ppm (<80 $mg/m^3$) could be obtained.

A catalyst containing Cu and V prepared according to Example 1 of German Patent Application P 37 27 642 was used. Some measurement results (ppm):

| Input | Output |
| --- | --- |
| $NO_x$ 312; $NH_3$ 70 | $NO_x$ 46; $NH_3$ 15 |
| $NO_x$ 224; $NH_3$ 70 | $NO_x$ 20; $NH_3$ 20 |
| $NO_x$ 285; $NH_3$ 70 | $NO_x$ 12; $NH_3$ 18 |
| $NO_x$ 173; $NH_3$ 93 | $NO_x$ 15; $NH_3$ 40 |
| The conversion $NO_x$ is in the region of 85 to 96% | |

COMPARISON EXAMPLE

Various active carbons were also used under the same conditions in the same apparatus. When moulded coal measuring 4 mm (activated peat) was used, conversion rates of from 12 to 21% $NO_x$ were obtained under the same experimental conditions; the conversion rates obtained with active coke were from 50 to 65% $NO_x$.

| Catalyst type | Temperature [°C.] | NO conversion [%] | Space time yield [h$^{-1}$] |
|---|---|---|---|
| Active Carbon* LEV 755 | 130 | 10-20 | 720 |
| BF coke** | 130 | 50-60 | 720 |
| RB coke*** | 130 | 40-50 | 720 |

*Commercial product of BAYER AG
**Type of coal based on hard coal produced by the "Bergbauforschungs-Gesellschaft"
***Activated brown coal It will be appreciated that the instant specification and claims are set forth by way of illustration and not limitation and that various modifications and changes may be made without departing from the spirit and scope of the present invention.

What is claimed is:

1. A process for the reduction of nitrogen oxides contained in exhaust gas comprising reacting said exhaust gas with a reducing agent in the presence of a catalyst, said catalyst being based on carbon and having a carbon content greater than 65% by weight and containing 0.1 to 10 weight % of a sparingly soluble oxide of a metal selected from the group consisting of one or more of Co, Fe, Ni, Cr, V, Mo, W, Cu, Mn and Ti and having a nitrogen content of from 0.5 to 5% by weight, wherein the molar ratio of the reducing agent to the nitrogen oxide is 0.3 to 0.7.

2. A process according to claim 1, wherein the reducing agent is carbon monoxide.

3. A process according to claim 1, wherein the reducing agent is ammonia.

4. A process according to claim 1, wherein the reaction is conducted with a volumetric velocity from 500 to 10,000 h$^{-1}$.

5. A process according to claim 4, wherein the volumetric velocity is from 1,000 to 3,000 h$^{-1}$.

6. A process according to claim 1, wherein the reaction is carried out at a temperature of from 50° to 180° C.

7. A process according to claim 6, wherein the temperature is from 90° to 150° C.

8. A process according to claim 1, wherein the metal is selected from the group consisting of Cu, V and Cu+V.

* * * * *